3,421,282
METHOD FOR OBTAINING CAPSULES HAVING OILY DRUGS CLOSED THEREIN
Masaru Hasegawa, Kamakura, Sadao Hirota, Chigasaki, and Hiroshi Ogawa, Kashiwa, Japan, assignors to Daiichi Kagaku Yakuhin Co., Ltd., Tokyo, Japan a corporation of Japan
No Drawing. Filed Sept. 24, 1964, Ser. No. 399,109
Claims priority, application Japan, Sept. 28, 1963, 38/51,605
U.S. Cl. 53—4     9 Claims
Int. Cl. B65b 7/28; B65b 51/00; A61k 9/04

ABSTRACT OF THE DISCLOSURE

The leakage of oily drugs from pharmaceutical capsules is prevented by adding fine powdered colloidal silica to the oily drugs in the capsules to gel the oily drugs in the capsules before the capsules are sealed.

---

The present invention relates to a method for obtaining capsules having oily drugs enclosed therein, and more particularly, to a method for obtaining capsules having oily drugs enclosed therein without fear of the leakage of the contents.

Lately, capsules are gaining comprehensive pharmaceutical and clinical importance because of the simplicity of dispensing and ease of administration. Capsules provide, also, an effective way of masking unpleasant tastes or odors of special medicines.

In spite of these advantages, capsules have rarely been used for oily drugs because of the difficulty of complete sealing to prevent the undesirable leakage of oily drugs out of the capsule.

The main object of the present invention is to prevent the leakage of oily drugs out of the capsule.

It has now been found that the above and other objects which will appear hereinafter can be achieved by changing the oily drugs in the capsule into a state of a gel by a simple addition of fine powdered colloidal silica as a gelling agent or a gelatinizer and thus immobilizing the oil. More particularly, an oily drug or a mixture thereof is put in the body part of a capsule and fine powdered colloidal silica is added to the oily drug to change it into a state of a gel and then the cap is applied. The oily drug may be diluted with an appropriate inert oil. The preferred range of particle size of the colloidal silica powder lies between 5 to 100 millimicrons. Fine powdered colloidal silica has proven to be harmless to the human body and the addition of the colloidal silica to a drug makes no difference upon the clinical effects of the drug. Therefore, the colloidal silica may be added in amounts which are sufficient for the formation of a gel. The maximum amount of oil may be 70 to 80% of the capacity of the body part of the capsule, but the preferred amount is from 20 to 40% of the capacity of the body part of the capsule. For example, 0.1 to 0.2 ml. of oil is adequate for capsule size No. 1 (according to J. P. General Rules for Preparations). The minimum amount of fine powdered colloidal silica needed to change the oil into a state of a gel depends on the nature of the oil. A hydrophobic oil such as silicon oil is easier to be gelled than a hydrophillic oil such as glyceryl mono-oleate. In most cases, the amount of fine powdered colloidal silica needed is from 0.1 to 10 times the weight of the oily drug used. When the capsule thus obtained is given to a patient, the capsule dissolves within the stomach and the ingredients are dispersed quickly and absorbed by the body. The oily drugs to be filled, include, for instance, cod liver oil, U.S.P., which has a disagreeable odor, vitamin A, vitamin A acetate, vitamin A palmitate, and vitamin E which are oily at room temperature and are not easy to administer in a definite amount, oleovitamins such as oleovitamin A, U.S.P., oleovitamin A and D, U.S.P., oleovitamin A and D, concentrate, U.S.P., synthetic oleovitamin D, U.S.P., oily extracts containing gonad stimulating hormones, and oily suspensions such as 4,4'-di-isoamyloxy-thiocarbanilide crystals suspended in corn oil which has stronger therapeutic activity than the crystal itself and other oily drugs. These oily drugs can be gelled and sealed without fear of the leakage of the gelled oils.

One of the most prominent applications of the present invention is to obtain capsules having oily radioactive substances enclosed therein.

Nowadays, the medical use of radioactive substances is developing and covering a wide range of applications. For example, glycerol trioleate and oleic acid labelled with radioactive iodine 131 are used for the evaluation of pancreas functions as well as for many other clinical purposes. Peanut oil and other oils labelled with radioactive iodine 131 are used clinically. The above-mentioned oils labelled with radioactive iodine 125 are also useful clinically. They are in many cases administered orally for diagonosis purposes or for the other therapy. In general, the handling of the radioactive substances may involve a serious danger such as pollution. Radioactive oily substances as described above especially require extremely careful precautions in handling and in administration in order to prevent dangerous radioactive pollution or the loss of radioactive energy.

Although difficulties such as are described above can be overcome by the use of capsules for these substances, a simple filling and stuffing of the oily radioactive substance in a capsule will cause the leakage of the radioactive oil during transportation or during periods of long storage and hence resulting capsules are not suitable for general use.

A further object of the present invention is, therefore, to obtain a capsule for the complete sealing therein of oily radioactive substances without fear of leakage of the contents of the capsule. This object is also achieved by a method according to the procedure as described above, in which oily radioactive substances are used as the oily drugs.

The present invention is further disclosed by the following examples which are illustrative only and not limitating with respect thereof.

Example 1

0.1 ml. of oleovitamin A, U.S.P. was put in a hard gelatin capsule of size No. 1 (according to J. P. General Rules for preparations) and 20 mg. of fine powdered colloidal silica of 5 to 20 millimicrons in particle size was added thereto. The oleovitamin A was changed into a gel immediately. By sealing this capsule body with a cap which was previously dipped in an alcoholic solution of polyvinyl pyrrolidone, a capsule of vitamin A oil which is free from leakage could be obtained.

Example 2

A capsule of oleovitamins A and D, concentrate, U.S.P. which is free from leakage was obtained by similar treatment as in Example 1, using 0.1 ml. of oleovitamins A and D, concentrate, U.S.P. and 20 mg. of fine powdered colloidal silica.

Example 3

A capsule containing cod liver oil, U.S.P. which is free from leakage was obtained by similar treatment as in Example 1, using 0.1 ml. of cod liver oil, U.S.P. and 20 mg. of fine powdered colloidal silica.

Example 4

0.1 ml. of glycerol trioleate-$I^{131}$ was put in a gelatin capsule of size No. 1 and 30 mg. of fine powdered colloidal silica was added thereto. A gel was immediately formed. By sealing this capsule with a cap which was previously dipped in an alcoholic solution of polyvinyl pyrrolidone, a capsule for the complete sealing of the radioactive substance could be obtained.

Example 5

A capsule containing radioactive oleic acid-$I^{131}$ could be obtained by similar treatment as in Example 4, using 0.1 ml. of oleic acid-$I^{131}$ and 20 mg. of fine powdered colloidal silica.

Example 6

A capsule containing radioactive peanut oil-$I^{131}$ could be obtained by similar treatment as in Example 4, using 0.1 ml. of peanut oil-$I^{131}$ and 20 mg. of fine powdered colloidal silica.

Example 7

A capsule containing glycerol trioleate-$I^{125}$ could be obtained by similar treatment as in Example 4, using glycerol trioleate-$I^{125}$ instead of glycerol trioleate-$^{131}$.

Example 8

A capsule containing radioactive oleic acid-$I^{125}$ could be obtained by similar treatment as in Example 5, using oleic acid-$I^{125}$ instead of oleic acid-$I^{131}$.

Example 9

A capsule containing peanut oil-$I^{125}$ could be obtained by similar treatment as in Example 6, using peanut oil-$I^{125}$ instead of peanut oil-$I^{131}$.

What is claimed is:

1. A method of preventing the leakage of oily drugs out of conventional pharmaceutical telescoping two-piece gelatin capsules having oily drugs enclosed therein which comprises adding fine powdered colloidal silica to the oily drug which had previously been put in the body part of a gelatin capsule in an amount sufficient to form a gel and sealing the body of the capsule with the gelatin cap therefor which had previously been dipped in an alcoholic solution of polyvinylpyrrolidone.

2. A method according to claim 1, in which the particle size of the fine powdered colloidal silica is in the range of 5 to 100 millimicrons.

3. A method according to claim 1, in which the fine powdered colloidal silica is used in an amount of from 0.1 to 10 times the weight of the oily drug.

4. A method according to claim 1, in which the amount of oily drug employed in said capsule occupies from 20 to 40% of the capacity of the body part of the capsule.

5. A method according to claim 1, in which the oily drug is a member selected from the class consisting of cod liver oil, U.S.P., vitamin A, vitamin A acetate, vitamin A palmitate and vitamin E.

6. A method according to claim 1, in which the oily drug comprises at least one oleovitamin.

7. A method according to claim 1, in which the oily drug comprises at least one radioactive oily substance.

8. A method according to claim 7, in which the radioactive oily substance is a member selected from the class consisting of glycerol trioleate-$I^{131}$, oleic acid-$I^{131}$, and peanut oil-$I^{131}$.

9. A method according to claim 7, in which the radioactive oily substance is a member selected from the class consisting of glycerol trioleate-$I^{125}$, oleic acid-$I^{125}$, and peanut oil-$I^{125}$.

References Cited

UNITED STATES PATENTS

| | | | |
|---|---|---|---|
| 2,638,179 | 5/1953 | Yard | 167—83 XR |
| 2,911,338 | 11/1959 | Tabern et al. | 167—51 |
| 2,970,056 | 1/1961 | Benson et al. | 167—81 XR |
| 3,061,510 | 10/1962 | Numerof et al. | 167—51 |
| 3,121,041 | 2/1964 | Stearn et al. | 167—51 |
| 3,127,313 | 3/1964 | Glenn | 167—51 |
| 3,159,545 | 12/1964 | Kidwell et al. | 167—83 |

OTHER REFERENCES

Chem. Abstracts 34: 3444(6) (1940).
Chem. Abstracts 36: 5321(2) (1942).

LEWIS GOTTS, *Primary Examiner.*

S. K. ROSE, *Assistant Examiner.*

U.S. Cl. X.R.

156—69; 424—33, 37; 53—21